US009604755B2

United States Patent
Ouchi et al.

(10) Patent No.: US 9,604,755 B2
(45) Date of Patent: Mar. 28, 2017

(54) ASSEMBLY PALLET

(71) Applicants: Takashi Ouchi, Okazaki (JP); Atsunori Hattori, Miyoshi (JP)

(72) Inventors: Takashi Ouchi, Okazaki (JP); Atsunori Hattori, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 14/045,202

(22) Filed: Oct. 3, 2013

(65) Prior Publication Data

US 2014/0103182 A1    Apr. 17, 2014

(30) Foreign Application Priority Data

Oct. 15, 2012  (JP) ................................ 2012-227718

(51) Int. Cl.

| | | |
|---|---|---|
| *B65D 19/00* | (2006.01) | |
| *B60L 11/00* | (2006.01) | |
| *B60L 11/18* | (2006.01) | |
| *B23Q 3/18* | (2006.01) | |
| *B23Q 3/10* | (2006.01) | |
| *B23Q 1/03* | (2006.01) | |

(52) U.S. Cl.
CPC ........... *B65D 19/0002* (2013.01); *B23Q 3/18* (2013.01); *B60L 11/005* (2013.01); *B60L 11/1864* (2013.01); *B60L 11/1874* (2013.01); *B60L 11/1879* (2013.01); *B23Q 1/035* (2013.01); *B23Q 3/103* (2013.01); *B60L 2240/545* (2013.01); *B65D 2519/0081* (2013.01); *B65D 2585/88* (2013.01); *Y02T 10/7011* (2013.01); *Y02T 10/7022* (2013.01); *Y02T 10/7061* (2013.01)

(58) Field of Classification Search
CPC .......... B23Q 3/103; B23Q 3/06; B23Q 3/106; B23Q 3/18; B25B 11/002; B25B 11/005; B25B 11/00; B25B 5/14; H01M 2/1044; H01M 2/1083; H01M 2/1072
See application file for complete search history.

(56) References Cited

U.S. PATENT DOCUMENTS 3,695,567 A * 10/1972 Weagle ...................... 248/188.6
4,579,271 A *  4/1986 Fujita ..................... B23K 37/04
                                                       228/46
4,641,819 A *  2/1987 Poland ............... B23K 37/0443
                                                       269/45

(Continued)

FOREIGN PATENT DOCUMENTS

JP    A-2004-182307        7/2004
JP    2010-272520 A        12/2010

(Continued)

*Primary Examiner* — Larry E Waggle, Jr.
*Assistant Examiner* — Seahee Yoon
(74) *Attorney, Agent, or Firm* — Oliff PLC

(57) ABSTRACT

An assembly pallet is assembled a cell stack to. The cell stack that includes a cell group in which a plurality of electric cells are stacked, end plates arranged in a position between which the cell group is interposed, and a restraining member for applying a restraint that restrains the cell group to the end plates. The assembly pallet includes a positioning engagement member that is engaged with the restraining member to effect positioning of the cell stack.

10 Claims, 7 Drawing Sheets

(56) References Cited

U.S. PATENT DOCUMENTS

| | | | | |
|---|---|---|---|---|
| 5,732,455 | A * | 3/1998 | Diede | B23K 37/053 |
| | | | | 269/311 |
| 5,829,151 | A * | 11/1998 | Collier | B23Q 7/14 |
| | | | | 33/1 M |
| 5,926,941 | A * | 7/1999 | Neri | B23Q 3/18 |
| | | | | 198/345.3 |
| 6,375,177 | B1 * | 4/2002 | Witte | B23Q 3/103 |
| | | | | 269/289 R |
| 6,394,005 | B1 * | 5/2002 | Isensee | A47B 3/0815 |
| | | | | 108/132 |
| 6,427,376 | B1 * | 8/2002 | Weber | A01K 97/01 |
| | | | | 248/538 |
| 2005/0183641 | A1 * | 8/2005 | Suzuki | A47C 4/20 |
| | | | | 108/129 |
| 2008/0000068 | A1 * | 1/2008 | Savoy | B23P 21/004 |
| | | | | 29/429 |
| 2013/0177793 | A1 * | 7/2013 | Seki | H01M 2/1077 |
| | | | | 429/99 |

FOREIGN PATENT DOCUMENTS

| | | |
|---|---|---|
| JP | B1-4858660 | 1/2012 |
| JP | A-2012-28032 | 2/2012 |
| JP | A-2013-093159 | 5/2013 |
| WO | WO 2012/039013 A1 | 3/2012 |

\* cited by examiner

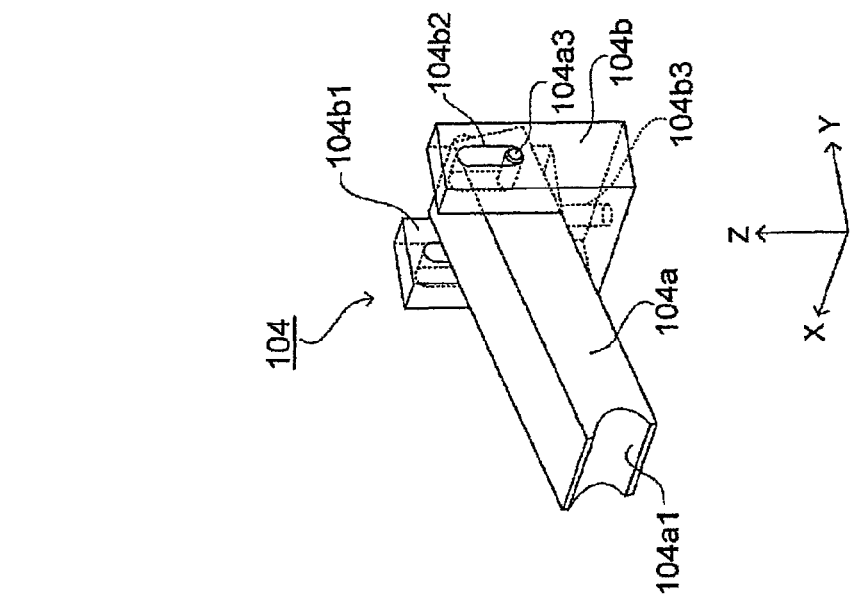

ASSEMBLY PALLET

INCORPORATION BY REFERENCE

The disclosure of Japanese Patent Application No. 2012-22718 filed on Oct. 15, 2012 including the specification, drawings and abstract is incorporated herein by reference in its entirety.

BACKGROUND OF THE INVENTION

1. Field of the Invention

The present invention relates to an assembly pallet to which a cell stack can be assembled.

2. Description of Related Art

A vehicle battery pack that includes a cell stack in which a plurality of electric cells are stacked is well-known as a battery device for supplying electric power to a vehicle drive motor. The vehicle battery pack is assembled to the assembly pallet in an assembly plant of a vehicle. The vehicle battery packs have various shapes in conformity with a mounting position in the vehicle, laws and regulations, or required performance, and therefore different assembly pallets with different shapes are required to be used depending on separate vehicle battery packs.

Japanese Patent Application Publication No. 2004-182307 (JP 2004-182307 A) discloses a transporting pallet for securing and transporting plural types of products which includes a base part formed into a generally plate shape, and a supporting block provided in the base part and formed with a plurality of receiving surfaces that come into contact with the products and support the product. The supporting block is formed into a stepped shape such that a plurality of the receiving surfaces have different dimensions from the base part in accordance with types of the products.

However, the production volume of a wide variety of the vehicle battery packs varies in a production plant, and therefore degradation in pallet change, securing of stock spaces, diversion to new vehicle battery packs in future, and the like may arise.

In addition, the transporting pallet disclosed in JP 2004-182307 A is a pallet for transporting a compressor utilized in the production line of compressors used for vehicle air conditioners, and it is not simply applicable to the vehicle battery packs. For example, when the transporting pallet disclosed in JP 2004-182307 A is applied to the battery pack, because the supporting block for supporting the products is fixed, there is a case where the pallet interferes with the supporting block and cannot be applied to the battery pack depending on the type of the battery pack.

SUMMARY OF THE INVENTION

Therefore, the present invention provides an assembly pallet to which plural types of the cell stacks that have different geometry can selectively be assembled.

A first aspect of the present invention relates to an assembly pallet to which a cell stack that includes a cell group in which a plurality of electric cells are stacked, end plates arranged in a position between which the cell group is interposed, and a restraining member for applying a restraint that restrains the cell group to the end plates is assembled. The assembly pallet includes a positioning engagement member that is engaged with the restraining member to effect positioning of the cell stack.

According to the first aspect of the present invention, an assembly pallet to which plural types of the cell stacks that have different geometry can selectively be assembled can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is an operation explanatory diagram of the second restraining rod positioning member according to an embodiment of the present invention and shows a state where the restraining rod positioning member effects positioning;

FIG. 4B is an operation explanatory diagram of the second restraining rod positioning member according to an embodiment of the present invention and shows a state where the restraining rod positioning member is allowed to rotate;

FIG. 4C is an operation explanatory diagram of the second restraining rod positioning member according to an embodiment of the present invention and shows a state where the restraining rod positioning member does not effect positioning;

DETAILED DESCRIPTION OF EMBODIMENTS

Figure 1:
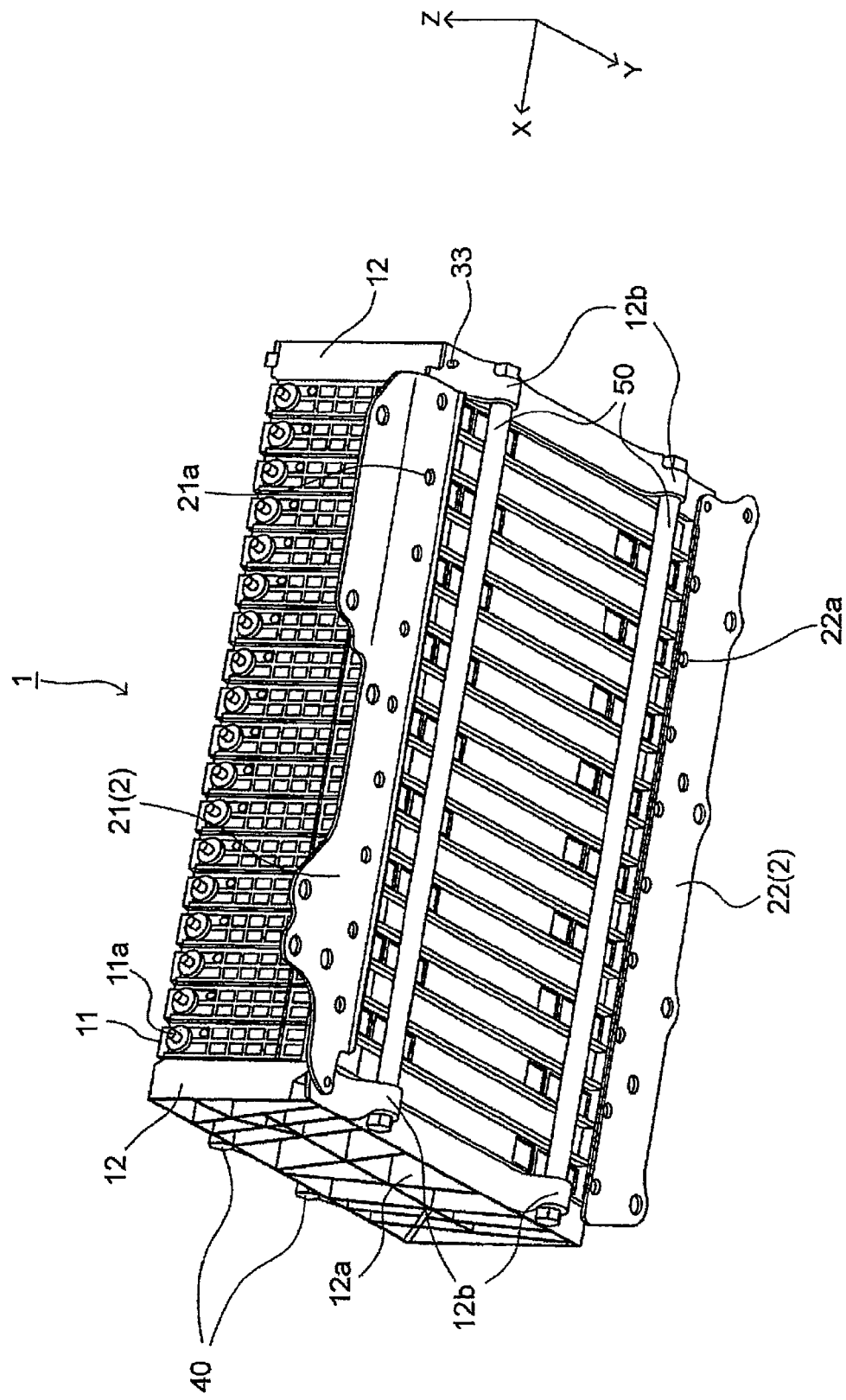
FIG. 1 is a perspective view of a cell stack according to an embodiment of the present invention.

A vehicle cell stack assembly process pallet (hereinafter, referred to as a process pallet) as one embodiment of the present invention will be described with reference to the attached drawings. FIG. 1 is a perspective view of a cell stack that is assembled on the process pallet, and X, Y, and Z show three axes in a three-dimensional space which are orthogonal to one another. The definitions of the X-axis, the Y-axis, and the Z-axis are the same for other drawings.

With reference to FIG. 1, a cell stack 1 includes a plurality of electric cells 11, end plates 12, upper restraining rods 40, and lower restraining rods 50. The electric cells 11 are stacked in X-axis directions. An electric cell 11 may be a secondary battery such as a lithium-ion battery and a nickel-metal hydride battery, or a capacitor. In addition, the electric cell 11 may be a battery module that includes a battery cell or a plurality of battery cells. The battery cell herein means an element in a minimum unit which is capable of charging and discharging.

A clearance is formed between the adjacent electric cells 11. The clearance is used as a passage for a heat exchange medium that controls the temperature of the electric cell 11. In a case where the heat exchange medium is a cooling medium herein, a temperature rise of each electric cell 11 that generates heat through the charging and the discharging can be suppressed by the cooling medium, and deterioration of the cell stack 1 can be prevented. In a case where the heat exchange medium is hot air, the electric cell 11 of which internal resistance increases due to a temperature fall is heated by the hot air, and thus input-output characteristics of the cell stack 1 can be improved.

A convex terminal 11a is formed on a side surface of the electric cell 11. Terminals 11a of the adjacent electric cells 11 are electrically and mechanically connected to each other through a bus bar (not shown). A serial connection or a parallel connection can be used for a connecting method. The terminals 11a that are positioned at ends in stacking directions are used as an integrated positive terminal and an integrated negative terminal of the cell stack 1. The integrated positive terminal and the integrated negative terminal can be used to take electric power that is generated in each electric cell 11 out of the cell stack 1. The electric power taken is supplied to a vehicle drive motor.

The end plates 12 are provided at positions where a plurality of the electric cells 11 are interposed therebetween. The end plates 12 may be made of resins. The end plates 12 are formed with a plurality of ribs 12a for reinforcing the structure. Restraining rod holding parts 12b are formed in an upper end surface and a lower end surface of the end plates 12, respectively. The upper restraining rod 40 extends in the X-axis direction along an upper surface of the electric cell 11, and the ends of the upper restraining rod 40 are fastened in the restraining rod holding parts 12b. The lower restraining rod 50 extends in the X-axis direction along a lower surface of the electric cell 11, and the ends of the lower restraining rod 50 are fastened in the restraining rod holding parts 12b.

By fastening the upper restraining rod 40 and the lower restraining rod 50 in the restraining rod holding parts 12b, a clamping force for clamping a plurality of the electric cells 11 is applied to the end plates 12. Accordingly, a positional displacement of a plurality of the electric cells 11 can be prevented. Incidentally, the lower restraining rod 50 is considered as a restraining member of the present invention. As described above, the restraining member can be shaped into a rod.

A convex end plate boss 33 is formed in the lower end surface of one of the end plates 12. The end plate boss 33 is used for positioning of the cell stack 1 during assembly thereof, and the details are described below.

Stack brackets 2 include a first stack bracket 21 and a second stack bracket 22. These first and second stack brackets 21 and 22 are formed into flat plate shapes. The first stack bracket 21 is attached to one end in the undersurface of the cell stack 1, and the second stack bracket 22 is attached to the other end in the undersurface of the cell stack 1. The stack brackets 2 may be made of metals.

A plurality of bracket openings 21a are formed in the first stack bracket 21. These bracket openings 21a are formed in a row in the X-axis direction. A plurality of bracket openings 22a are formed in the second stack bracket 22. These bracket openings 22a are formed in a row in the X-axis direction. Incidentally, the cell stack 1 is housed in a pack case that includes an upper case and a lower case (not shown), and a battery pack is secured by fastening the lower case on a floor panel.

Figure 2:
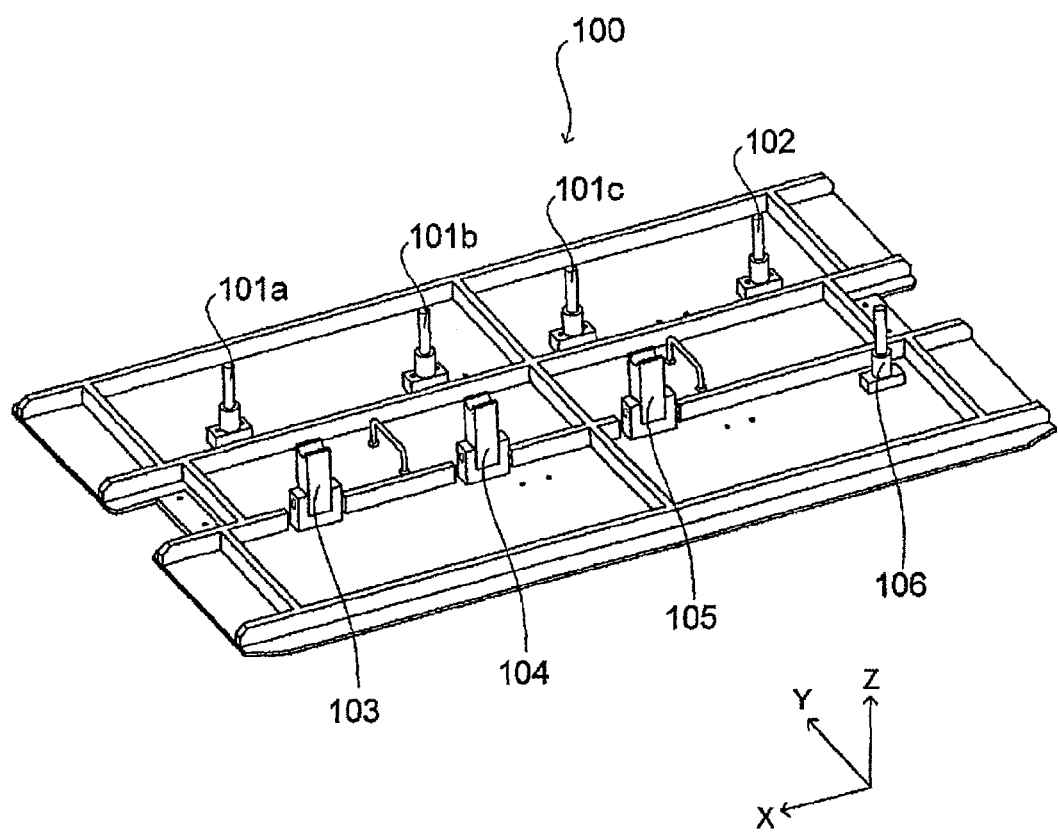
FIG. 2 is a perspective view of a process Pallet according to an embodiment of the present invention.

FIG. 2 is a perspective view of the process pallet. The process pallet 100 includes a first through a third folding pins 101a through 101c, a fixed pin 102, a first through a third restraining rod positioning members (which can be considered as a positioning engagement member of the present invention) 103 through 105, and a boss positioning pin 106. The first through the third folding pins 101a through 101c and the fixed pin 102 are provided in line in the X-axis direction. The first through the third folding pins 101a through 101c can change their positions between a receiving position extending in the Z-axis direction and a non-receiving position extending in the Y-axis direction. FIG. 2 shows a state where the first through the third folding pins 101a through 101c are in the receiving positions.

Figure 3A:
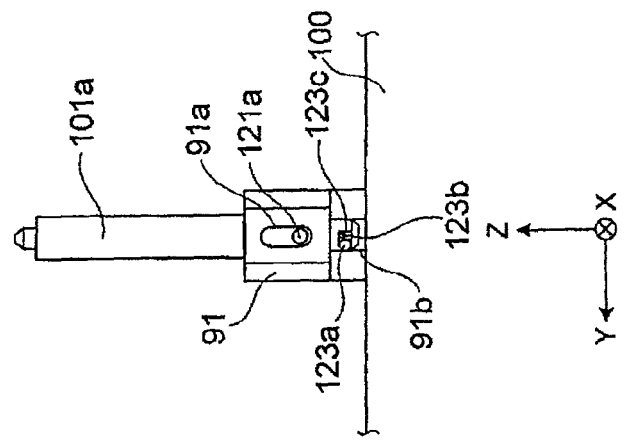
FIG. 3A is an operation explanatory diagram of the first folding pin according to an embodiment of the present invention and shows a state where the folding pin is in a non-receiving position.
Figure 3B:
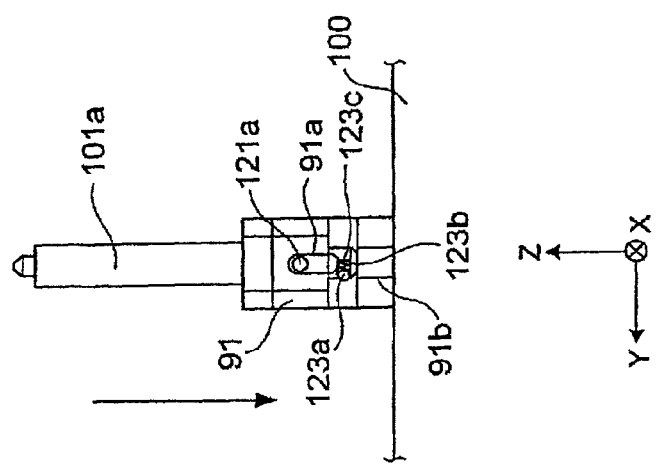
FIG. 3B is an operation explanatory diagram of the first folding pin according to an embodiment of the present invention and shows a state where the folding pin is in a receiving position (before locking)
Figure 3C:
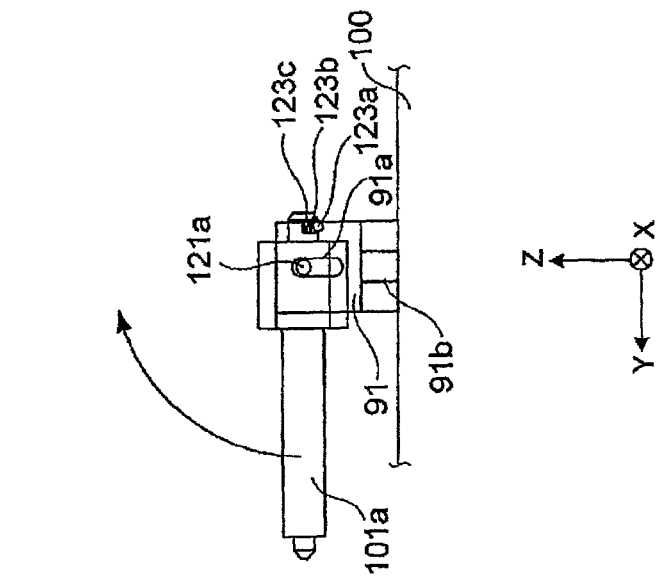
FIG. 3C is an operation explanatory diagram of the first folding pin according to an embodiment of the present invention and shows a state where the folding pin is in a receiving position (after locking)

With reference to FIGS. 3A through 3C, a position change mechanism for changing the position of the first folding pin 101a between the receiving position and the non-receiving position is described next. FIG. 3 shows operation explanatory diagrams of the first folding pin. FIG. 3A, FIG. 3B, and FIG. 3C respectively show a non-receiving position, a receiving position (before locking), and a receiving position (after locking). It should be noted that the structure of the position change mechanism are the same as in other folding pins, and therefore the descriptions are not repeated.

With reference to FIG. 3, a pedestal 91 is formed on the process pallet 100. The pedestal 91 is formed with an elongated hole 91a and a locking hole 91b. A shaft 121a extending in the X-axis direction is formed on the first folding pin 101a. The shaft 121a can engage with the elongated hole 91a and move from one end to the other end of the elongated hole 91a. A bottomed cylindrical locking mechanism housing 123c is formed in a base end section of the first folding pin 101a. A locking spring 123b is mounted in the undersurface of the locking mechanism housing 123c, and a locking pin 123a is fixed on a distal end of the locking spring 123b. When the locking pin 123a is pushed into the undersurface of the locking mechanism housing 123c, the locking spring 123b is urged toward a compression direction.

In a state shown in FIG. 3A, the position of the first folding pin 101a is changed in the direction of an arrow (clockwise direction) about the shaft 121a as the axis of rotation. Then, the first folding pin 101a moves to a position shown in FIG. 3B, that is, an unlocked position where the axial direction of the first folding pin 101a is directed to a board thickness direction of the process pallet 100. At this time, the edge of the locking hole 91b is positioned directly under the locking pin 123a. In a state shown in FIG. 3B, the first folding pin 101a is pushed downward (in the direction of an arrow and toward the direction where the locking hole 91b is positioned). Then, the locking pin 123a comes into contact with the edge of the locking hole 91b.

When the first folding pin 101a is pushed further, the locking pin 123a moves downward along a wall surface of the locking hole 91b while urging the locking spring 123b and then moves to a locked position shown in FIG. 3C. Accordingly, the locking pin 123a is pressed against the wall surface of the locking hole 91b by the spring force of the locking spring 123b. Therefore, the first folding pin 101a can be retained in the locked position.

At least one of the first through the third folding pins 101*a* through 101*c* is engaged with any one of the bracket openings 22*a* in the second stack bracket 22 when the cell stack 1 is assembled. The folding pins that are not engaged with the bracket openings 22*a* are operated to be positioned in the non-receiving position.

The folding pins that are engaged with the bracket openings 22*a* vary according to the type of the cell stack 1. That is to say, there are cases where the positions of the bracket openings 22*a* may vary according to the type of the cell stack 1. Therefore, the folding pins that are not engaged with the bracket openings 22*a* are operated to be positioned in the non-receiving position. The type of the cell stack 1 is determined in accordance with the number of the electric cells 11, namely, the size of the cell stack 1. The fixed pin 102 is formed at a position where the fixed pin 102 is engaged with one of the bracket openings in all the cell stacks.

With reference to FIGS. 4A through 4C, the structure of the second restraining rod positioning member 104 is described, FIG. 4 shows perspective views that illustrate the operation of the second restraining rod positioning member 104, in which FIG. 4A shows a state where the positioning member effects positioning (namely, a state where the positioning member is positioned at an engaging position), FIG. 4B shows a state where the positioning member is allowed to rotate, and FIG. 4C shows a state where the positioning member does not effect positioning (namely, a state where the positioning member is positioned at a non-engaging position). It should be noted that the first and the third restraining rod positioning members 103 and 105 have the same structure as that of the second restraining rod positioning member 104, and therefore the descriptions are not repeated.

With reference to FIG. 4A, the second restraining rod positioning member 104 has a rotating member 104*a* and a base 104*b*. The rotating member 104*a* is formed into a rectangular parallelepiped shape. A receiving surface 104*a*1 is formed in a front end of the rotating member 104*a* in a longitudinal direction. A rotation regulating pin 104*a*2 is formed in a rear end of the rotating member 104*a* in a longitudinal direction. The receiving surface 104*a*1 is formed into a concave shape and can support the lower restraining rod 50 during the assembly of the cell stack 1. The rotation regulating pin 104*a*2 is formed into a cylindrical shape and extends in the Z-axis direction. A guide pin 104*a*3 is formed on a side surface of the rotating member 104*a* in the X-axis direction. The guide pin 104*a*3 is formed into a cylindrical shape and extends in the X-axis direction.

A recess section 104*b*1 is formed in the base 104*b*, and the rotating member 104*a* is fitted in the recess section 104*b*1. A minute clearance that allows the movement of the rotating member 104*a* is formed between the recess section 104*b*1 and the rotating member 104*a*. In other words, the rotating member 104*a* is fitted in the recess section 104*b*1 so as to be capable of changing its positions. A guide opening 104*b*2 that passes through in the X-axis direction and extends in the Z-axis direction is formed on a side surface of the recess section 104*b*1. A rotation regulating opening 104*b*3 that extends in the Z-axis direction is formed in the undersurface of the recess section 104*b*1.

The guide pin 104*a*3 of the rotating member 104*a* is engaged in the guide opening 104*b*2. The guide pin 104*a*3 can be moved along an inner wall surface of the guide opening 104*b*2 in the Z-axis direction. The rotation regulating pin 104*a*2 is fitted in the rotation regulating opening 104*b*3. The rotation regulating pin 104*a*2 can be moved along an inner wall surface of the rotation regulating opening 104*b*3 in the Z-axis direction.

The operation of the rotating member 104*a* is described next. With reference to FIG. 4A, the guide pin 104*a*3 is positioned in a lower end of the guide opening 104*b*2, and the rotation regulating pin 104*a*2 is positioned inside the opening of the rotation regulating opening 104*b*3, during the positioning. Accordingly, the rotation regulating pin 104*a*2 is positioned inside the opening of the rotation regulating opening 104*b*3, and thus a rotation movement of the rotating member 104*a* is prohibited.

When the rotating member 104*a* is moved in the direction of an arrow (Z-axis direction), the guide pin 104*a*3 moves from the lower end of the guide opening 104*b*2 to its upper end. At the same time, the rotation regulating pin 104*a*2 is withdrawn from the rotation regulating opening 104*b*3 (see FIG. 4B). In a state where the rotation regulating pin 104*a*2 is withdrawn from the rotation regulating opening 104*b*3, the rotating member 104*a* is rotated in direction of the arrow. Then, the second restraining rod positioning member 104 can be operated to a non-positioning position shown in FIG. 4C.

As described above, a plurality of the restraining rod positioning members 103, 104, and 105, namely the positioning engagement members can be provided in a direction where the lower restraining rod 50 extends. The positioning engagement member can have the folding structure in which the position can be changed between the engaging position where the positioning engagement member is engaged with the lower restraining rod 50 and the non-engaging position where the positioning engagement member is not engaged with the lower restraining rod 50. Furthermore, in the engaging position, the rotation movement of the rotating member 104*a* is prohibited because the rotation regulating pin 104*a*2 is positioned in the rotation regulating opening 104*b*3, and in the non-engaging position, the rotation movement of the rotating member 104*a* is allowed because the rotation regulating pin 104*a*2 is withdrawn from the rotation regulating opening 104*b*3. Accordingly, the assembly pallet to which plural types of the cell stack can selectively be assembled can be provided with a simple structure. This will enable the cost reduction.

Figure 5:
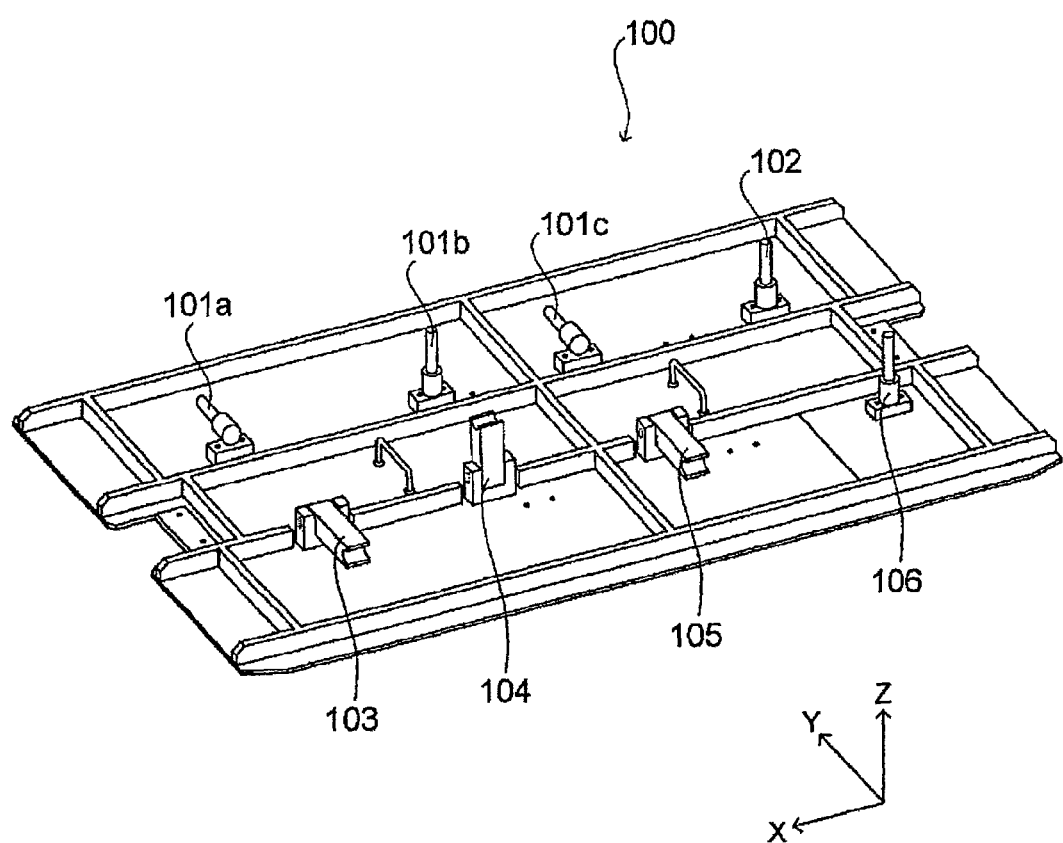
FIG. 5 is a perspective view of the process pallet immediately before assembling according to an embodiment of the present invention.
Figure 6:
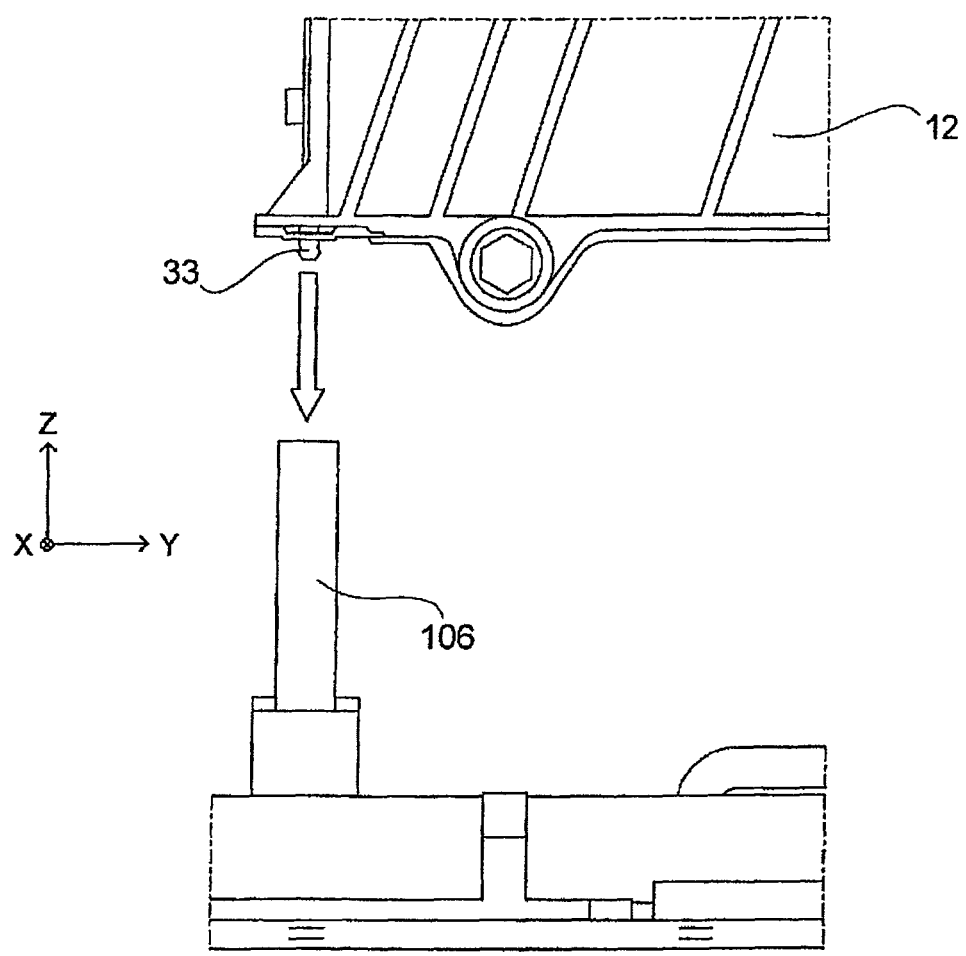
FIG. 6 illustrates a state immediately before the end plate boss according to an embodiment of the present invention is fitted in a boss positioning pin.
Figure 7:
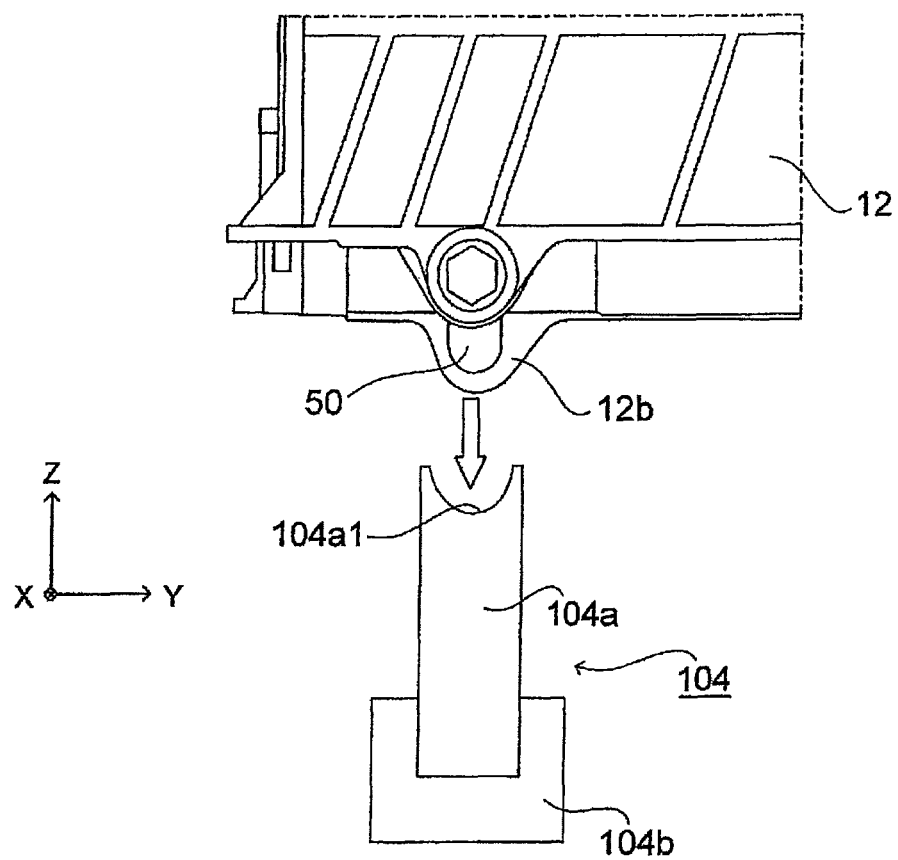
FIG. 7 illustrates a state immediately before a lower restraining rod according to an embodiment of the present invention is placed on a receiving surface.

With reference to FIG. 5 through FIG. 7, an assembly method of the cell stack is described next. FIG. 5 is a perspective view of the process pallet 100 immediately before the cell stack is assembled to the process pallet. FIG. 6 is an operation explanatory diagram that illustrates the operation when the end plate boss 33 is fitted in the boss positioning pin 106. FIG. 7 is an operation explanatory diagram that illustrates the operation when the lower restraining rod 50 is placed on the receiving surface 104*a*1.

With reference to FIG. 5, the restraining rod positioning members of the first through the third restraining rod positioning members 103 through 105 except the second restraining rod positioning member 104 are folded because they are not used for the positioning. The folding pins 101*a* and 101*c* of the first through the third folding pins 101*a* through 101*c* except the second folding pin 101*b* are also folded because they are not used for receiving the cell stack 1.

Next, the cell stack 1 is assembled to the process pallet 100 from above the process pallet. At this time, the end plate boss 33 is fitted in the opening of the boss positioning pin 106 as shown in FIG. 6, and the lower restraining rod 50 is placed on the receiving surface 104*a*1 as shown in FIG. 7. Accordingly, the cell stack 1 is positioned to the process pallet 100.

The method for positioning the cell stack 1 by omitting the first through the third restraining rod positioning members 103 through 105 and providing a plurality of folding pins that have the same structure as that of the first folding pin 101*a* to the process pallet 100 can be considered here. However, in the method described above, the number of the folding pins is required to be increased in accordance with the type and the mounting position of the cell stack, and therefore the cost may increase. In addition, when plural types of the cell stacks are assembled while conveyed through one assembly line, the labor of folding and raising the folding pins increases, and therefore the labor effectiveness may be lost. As described above, the first folding pin 101*a* has a complex mechanism and a number of parts and processes, and thus the cost increases in comparison with the first through the third restraining rod positioning members 103 through 105.

According to the first through the third restraining rod positioning members 103 through 105 of the present embodiment, efficient assembling work can be achieved, while the cost is reduced in comparison with a case where the folding pins are used for positioning.

(Modification Example)

In the embodiment described above, a plurality of the electric cells 11 are restrained with the upper restraining rod 40 and the lower restraining rod 50; however, the present invention is applicable to the cell stack using a restraining band. Incidentally, the restraining band means a flat plate member that extends in a stacking direction of the electric cells 11 and in which the ends are bent in a shape of the letter L. A plurality of the electric cells 11 are interposed and restrained between the end plates 12 by securing a bending part of the restraining band to the end plates 12. When the cell stack is assembled to the process pallet 100, the restraining band is placed on the receiving surface of the restraining rod positioning member, and thus the cell stack can be positioned. Other effects are in common with the present embodiment described above, and therefore the descriptions are not repeated.

What is claimed is:

1. A secondary battery assembly pallet for use with a cell stack, the cell stack including: a secondary battery, a plurality of end plates, a restraining member, and a convex end plate boss formed in a lower end surface of the plurality of end plates for positioning the cell stack, the secondary battery assembly pallet comprising:
   a pallet body configured to support the cell stack;
   a first row including a plurality of folding pins, or at least one folding pin and at least one fixed pin;
   a second row including a plurality of positioning, engagement members, the plurality of positioning engagement members being disposed on the pallet body, the plurality of positioning engagement members being configured to: (i) support the restraining member in order to position the cell stack on the secondary battery assembly pallet, and (ii) fold towards and away from the pallet body, each of the plurality of positioning engagement members having a receiving surface configured to receive the restraining member, the receiving surface of each of the plurality of positioning engagement members being a concave shape; and
   at least one boss positioning pin configured to support the convex end plate boss.

2. The secondary battery assembly pallet according to claim 1, wherein
   the plurality of the positioning engagement members are provided in a direction in which the restraining member extends, and each of the plurality of the positioning engagement members has a folding structure configured to change a position of each of the plurality of the positioning engagement members between: (i) a supporting position where the positioning engagement members support the restraining member, and (ii) a non-supporting position where the positioning engagement members do not support the restraining member.

3. The secondary battery assembly pallet according to claim 2, wherein
   each of the plurality of the positioning engagement members includes: (i) a base that has a recess section, and (ii) a rotating member that is fitted in the recess section so as to change a position of the rotating member;
   in an undersurface of the recess section, a rotation regulating opening is provided, and a rotation regulating pin that protrudes from the rotating member is inserted into the rotation regulating opening;
   in the supporting position, the rotation movement of the rotating member is restricted by positioning the rotation regulating pin in the rotation regulating opening; and
   in the non-supporting position, the rotation movement of the rotating member is allowed by withdrawing the rotation regulating pin from the rotation regulating opening.

4. The secondary battery assembly pallet according to claim 1, wherein:
   the boss positioning pin has an opening at a tip end of the boss positioning pin.

5. The secondary battery assembly pallet according to claim 1, wherein the plurality of folding pins or the at least one folding pin are/is configured to receive the cell stack.

6. The assembly pallet according to claim 5, wherein the plurality of folding pins are provided in a direction in which the restraining member extends, and each of the plurality of folding pins has a folding structure configured to change a position of each of the plurality of folding pins between: (i) an engaging position where the folding pins receive the cell stack, and (ii) a non-engaging position where the folding pins do not receive the cell stack.

7. A secondary battery assembly comprising:
   a secondary battery cell stack including:
      a plurality of end plates;
      a cell group having a plurality of electric cells stacked relative to each other, the cell group being disposed in between the plurality of end plates;
      a restraining member configured to restrain the cell group to the plurality of end plates; and
      a convex end plate boss formed in a lower end surface of the plurality of end plates for positioning the cell stack; and
   a secondary battery assembly pallet configured to support the cell stack, the secondary battery assembly pallet including;
      a pallet body configured to support the cell stack
      a first row including a plurality of folding pins, or at least one folding pin and at least one fixed pin;
      a second row including a plurality of positioning engagement members, the plurality of positioning engagement members being disposed on the pallet body, the plurality of positioning engagement members being configured to: (i) support the restraining member in order to position the cell stack on the secondary battery assembly pallet, and (ii) fold towards and away from the pallet body, each of the plurality of positioning engagement members having a receiving surface configured to receive the restraining member, the receiving surface of each of the plurality of positioning engagement members being a concave shape; and at least one boss positioning pin configured to support the convex end plate boss.

8. The secondary battery assembly according to claim 7, wherein:

the boss positioning pin has an opening at a tip end of the boss positioning pin.

9. The secondary battery assembly according to claim 7, wherein the plurality of the positioning engagement members are provided in a direction in which the restraining member extends.

10. The secondary battery assembly according to claim 7, wherein the restraining member has a rod shape.

* * * * *